Figure 1:
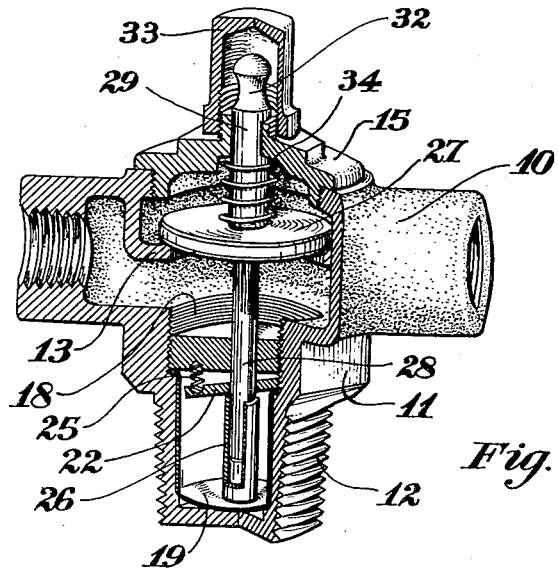

Jan. 2, 1934.    J. A. SPENCER    1,942,009
VALVE
Filed May 31, 1930    2 Sheets-Sheet 1

John A. Spencer, INVENTOR.

BY

ATTORNEY.

Jan. 2, 1934.                J. A. SPENCER                1,942,009
                              VALVE
                        Filed May 31, 1930           2 Sheets-Sheet 2

John A. Spencer, INVENTOR.

BY

ATTORNEY.

Patented Jan. 2, 1934

1,942,009

UNITED STATES PATENT OFFICE 1,942,009

VALVE

John A. Spencer, Newton, Mass., assignor to The Spencer Thermostat Company, Cambridge, Mass., a corporation of Massachusetts Application May 31, 1930. Serial No. 457,757

13 Claims. (Cl. 137—139)

The present invention relates to a temperature controlled valve of the type wherein the operation of the valve is controlled by the temperature of a fluid flowing externally of the valve casing, the actuating member being in thermal contact with the external fluid, the operation of the valve controlling a flow of fluid passing through the valve casing. More specifically, the invention relates to a thermostatically controlled valve adapted for use in connection with domestic water heaters, to prevent the overheating of the water, the thermostat being in thermal contact with the water, and the fuel (e. g. gas) passing through the valve on its way to the heater being cut off when the temperature of the circulating water reaches the operating temperature of the thermostat. Although the invention is specifically described in connection with a gas water heater, it will be understood that it may be adapted for use in connection with the breaking of an electric circuit, or the cutting off of a supply of liquid fuel in the event that the heater is an oil burner. In the illustrated form of the invention, the valve must be opened manually after it has been thrown shut by the thermostat controlling it, and while it is readily capable of adaptation to full automatic operation, nevertheless if the fuel passing through the valve be gas, as in the majority of instances, the manual opening is a safety feature, in that there is no chance of automatic opening of the valve when the gas is unlighted.

The present invention marks a decided improvement in the prior art through the provision of a latching arrangement to hold the valve open while the fluid is passing through it, the latching arrangement being thermostatically operated and being adapted to be tripped by a slight movement of the latch, which movement can be obtained by the use of a relatively small thermostat placed within the same housing as the latch, thus materially reducing the size of the assembly, while increasing its compactness and producing a finished article cheap to manufacture, positive and reliable in its operation, and which presents a pleasing appearance.

The thermostat employed in this invention is desirably that employed in the snap-acting bimetallic thermostat described and claimed in my prior United States Patent 1,448,240, issued March 13, 1923, the thermostat being placed in thermal contact with the fluid, such as water, which it is desired to protect from overheating.

The invention accordingly comprises the elements and combinations of elements, features of construction, and arrangements of parts which will be exemplified in the structures hereinafter described, and the scope of the application of which will be indicated in the following claims.

Figure 2:
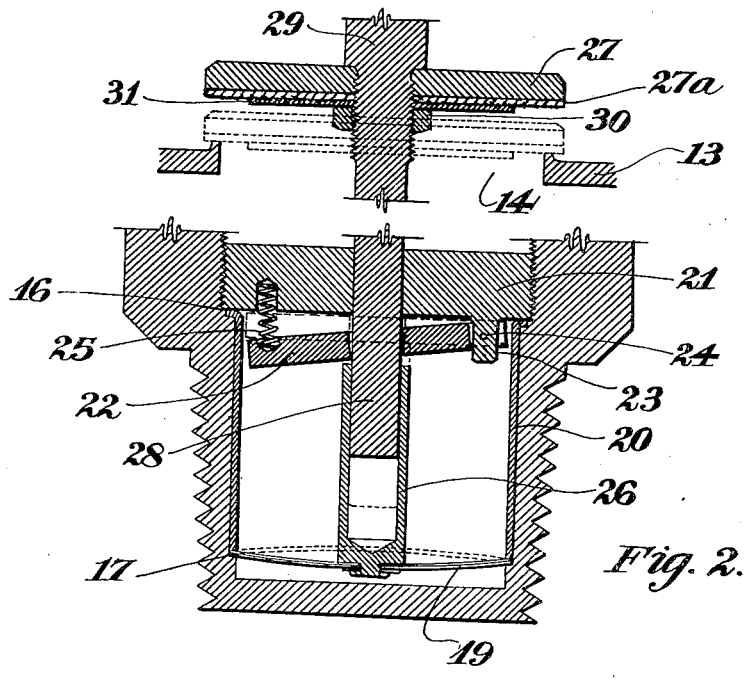
Figure 3:
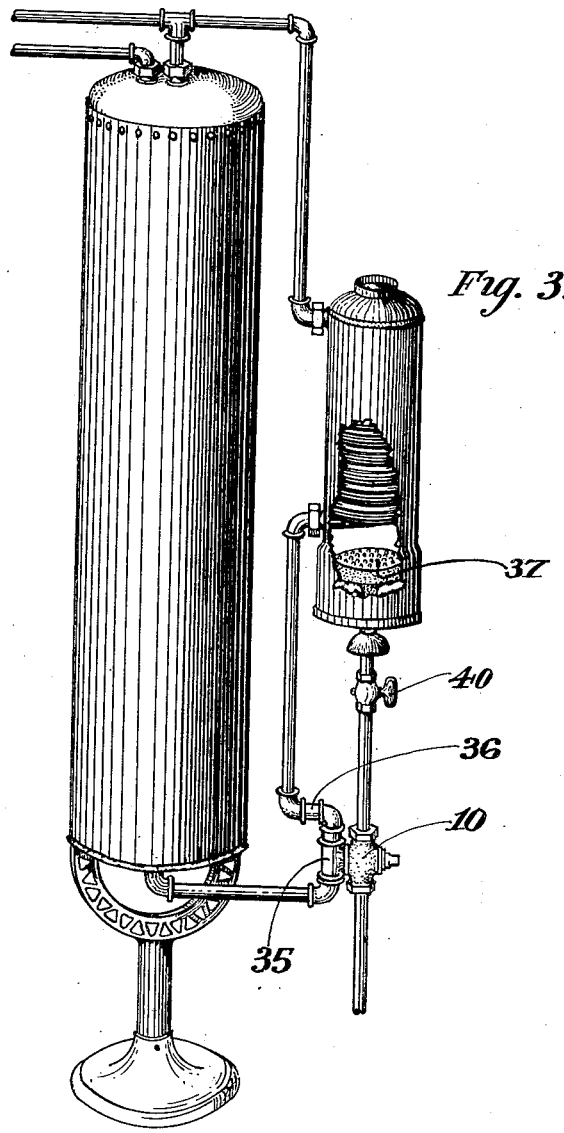

The invention will be more clearly understood by reference to the accompanying drawings, which represent one type of valve constructed in accordance with this invention, and in which Figure 1 is a perspective view of a valve, partly in section to show its interior construction, Figure 2 is a fragmentary detailed sectional view of the valve member with its operating mechanism, and Figure 3 is a perspective view illustrating an installation of the valve.

Similar reference characters indicate corresponding parts throughout the several views of the drawings.

Referring more particularly to the drawings, numeral 10 represents the valve casing, a portion 11 of which forms a housing for the valve operating mechanism, the housing 11 being externally threaded as shown at 12 for insertion into a hot water line. The casing 10 has a dividing partition 13 in which is the port 14 through which the gas must pass on its way through the casing, the port being opened and closed by the valve member 27. The casing 10 is formed so that a cap 15 may be threaded therein to permit access to the interior of the casing. This cap has a hole passing through it to form a guide for the valve stem head 29, one end of which is inserted through this hole.

As will be clearly seen from the drawings, housing 11 is an integral part of casing 10, and opens into the interior of the casing 10, at any desired place, the housing 11 being provided with internal annular shoulders 16 and 17, and also being interiorly threaded, as at 18 from its opening into the casing 10 to the shoulder 16. Resting upon shoulder 17 is a snap-acting composite thermostatic sheet 19, which is secured in place by the tubular member 20 which tightly engages the interior wall of the housing 11, and one end is brought adjacent to the thermostat 19 sufficiently close to prevent displacement while permitting the snapping of the thermostat to the position shown in dotted lines in Figure 2. The other end of sleeve 20 is extended slightly beyond the shoulder 16, the end being bent around the shoulder to provide a surface for engagement with the member 21, which serves as an anchoring member for the tubular member 20, the member 21 being in tight engagement with the end of member 20 by the threads 18 with which member 21 is threaded to the casing 11.

The member 21 carries a latching member 22, hinged to the member 21 through the hinge 23 and pin 24, spring 25 holding the latching member 22 in position. The member 21 and latching member 22 are adapted to receive a valve stem 28, therethrough, said member 21 having a hole through it just large enough for the stem to freely pass, and latching member 22 having a hole of the same size or slightly larger than the hole in said member 21 through which the stem passes. Secured to the thermostat 19 is a sleeve 26 into which the valve stem 28 slidably fits, the sleeve 26 being also positioned adjacent the latch 22 to trip the latch when the thermostat 19 operates.

Valve member 27 seats over the port 14 to effectively close the port against passage of fluid therethrough, the valve member 27 being threaded on the valve stem 28 against the enlarged head 29 thereof and having a resilient washer 27a thereon, the washer and valve member being secured by nut 30 and plate 31. The enlarged head 29 passes through the cap 15 and terminates in the handle 32 protected by a cap 33, removably secured to the cap 15 threaded into the casing 10. Other means may be employed to protect the head 29 without departing from the spirit of the invention. The valve stem 28 passes through the holes in the member 21 and latch 22, and then into the sleeve 26, terminating somewhat short of the closed end of the sleeve. The stem 28 fits loosely into the members 26, 21 and also the latch 22 when said latch is in a position parallel to member 21.

The stem head 29 has a coiled spring 34 around it, the spring bearing against the interior of the cap 15 and against the valve member 27 to facilitate the closing of the valve member.

In operation, the housing 11 is fitted into a T-connection 35 situated in a hot water line 36 so that the thermostat 19 is in thermal contact with the hot water through the line 36. To light the burner 37, cap 33 is removed and the valve stem is pulled outwardly against the tension of the spring 34 until the stem 28 is latched by the latch 22, the valve member 27 thus being unseated from the port 14 to permit the gas to flow.

Thermostat 19 is then in the position shown in Figure 2, this thermostat being formed to snap at a predetermined temperature. When this temperature is reached, the thermostat 19 snaps into the position shown by dotted lines in Fig. 2, thus lifting the sleeve 26 against the latch 22 to move said latch into the position of the dotted lines of Fig. 2 to free the stem 28, which under the action of gravity or the pressure of spring 34 against the valve member 27, or both, takes its position indicated in Fig. 2, and the valve member 27 then seats over the port 14 to stop the flow of gas passing therethrough on its way to the burner, the various elements taking the position indicated by dotted line in Figure 2. To start the flow of gas again, the valve is reset by hand as above described.

The provision of a hand operated valve 40 (Fig. 3) is optional inasmuch as the thermostatic valve is reliable and effective. However, the valve 40 may prove useful in regulating the amount of gas feeding the burner 37.

It will be noted that the snap-acting thermostatic member 19 provides an impact for operating the latch 22. The provision of such an impact insures positive operation of the valve when a predetermined temperature is reached. Should the assembly become dirty or stiff from infrequent use it is clear that the sudden motion and impact provided is useful in effecting a positive operation.

It is to be understood that the latch member may be of any desired construction, but one such as herein described which automatically grips and releases the valve stem is very convenient. Cap 15 provides ready means for access to the interior of the casing for the assembly, dismantling and repair of the valve mechanism.

In view of the above, it will be seen that the several objects of the invention are achieved and other advantageous results attained.

It will be apparent that many changes in the construction of the device can be made without departing from the inventive concept; and that these variations from the specifically described and illustrated example will be apparent to one skilled in this art. Accordingly, it will be understood that it is intended and desired to embrace within the scope of this invention, such modifications and changes as may be necessary to adapt it to varying conditions and uses.

What is claimed is:

1. A valve comprising the combination within a casing, of a valve member adapted to control a flow of fluid therethrough, a snap-acting thermostatic sheet, and means between the sheet and the said valve member, said sheet and said means cooperating to control the operation of the valve member, the said sheet being affected by temperature changes of a fluid by which a part of the casing is adapted to be surrounded.

2. A valve comprising the combination within a casing, of a valve member adapted to control a flow of fluid therethrough and having a tendency to seat, the said valve having a stem, a latch member adapted to grip the stem to hold the valve member in open position, and thermostatic means adapted to be actuated by temperature changes in a fluid exteriorly of the casing, said means being adapted to operate the latch member to release said stem whereby said valve member is seated.

3. A valve comprising the combination within a casing, of a valve member adapted to control a flow of fluid therethrough and having a tendency to seat, the valve member having a stem, a hinged latch adapted to grip the stem to hold the valve member in open position, and means adapted to be suddenly responsive to a predetermined temperature change exteriorly of the casing adapted to release the latch to permit the valve member to seat.

4. A valve comprising the combination within a casing of a valve member adapted to control a flow of fluid through the casing and tending to move to closed position, a stem extending from both sides of the valve member, one end of said stem comprising a handle for manually opening the valve, the other end of the stem extending a substantial distance within the casing, a thermostatic sheet adapted to be in thermal contact with fluid exteriorly of the casing and suddenly responsive to a predetermined temperature change in said fluid, a latch means adapted to engage the stem to hold said valve member in open position, said means being controlled by the operation of the thermostatic sheet to release the valve member.

5. In combination a casing, a portion of which comprises a housing for valve controlling elements, the housing being adapted to be inserted in a fluid line to bring the valve controlling elements into thermal contact with fluid in the said line and exteriorly of the housing, a valve member in said casing adapted to control flow of fluid through the casing and tending to move to seating position, the valve member having a stem, one end of which terminates in a handle for manually unseating the valve member, the other end of the stem extending for a substantial distance into the housing, a thermostatic sheet in said housing adapted to be in thermal contact with fluid exteriorly of the housing and suddenly responsive to a predetermined temperature change in the exterior fluid, a latching member adapted to engage the stem to hold the valve member in said unseated position, and means associated with the thermostatic sheet adapted to operate the latching member to release the said stem and the valve member.

6. A valve comprising the combination within a casing, of a valve member for controlling flow of fluid through the casing and tending to move to seating position, the valve member having a stem extending from both sides of said valve member, one end of which terminates as a handle for manually unseating the valve member, the other end of the stem extending a substantial distance from said valve member, a thermostatic sheet adapted to be in thermal contact with fluid exteriorly of the casing, the sheet being suddenly responsive to a predetermined temperature change in said exterior fluid, a hinged latching member adapted to automatically hold the valve stem to hold the valve member in unseated position when the valve member is drawn to such position, a sleeve on the said thermostatic sheet loosely receiving the valve stem therein, said sleeve upon operation of the said sheet being adapted to release the latching member from the valve stem to permit the seating of the valve member.

7. A valve member comprising the combination with a casing, a portion of which casing forms a housing for valve controlling elements, the housing being adapted to be inserted in a fluid line to bring the valve controlling elements into thermal contact with fluid in the said line and exteriorly of the housing, of a valve member for controlling flow of a fluid through the casing, the valve member having a stem, one end of which terminates as a handle for unseating the valve member, the other end of the stem extending for a substantial distance into the housing, a cap threaded into the casing adapted to guide the portion of the stem having the handle, a spring tending to seat said valve member, a second cap removably secured over the handle, a thermostatic sheet within the housing adapted to be in thermal contact with the fluid exteriorly of the housing in the said line, the sheet being suddenly responsive to a predetermined temperature change in the said exterior fluid, a hinged latching member within the housing adapted to automatically hold the portion of the valve stem extending therein to hold the valve member in unseated position when the valve member is drawn to such position, and a sleeve mounted on said thermostatic sheet loosely engaging the valve stem and upon operation of the said sheet, adapted to release the latching member from the valve stem to permit the seating of the valve member.

8. A valve comprising a casing a portion of which casing forms a housing for temperature responsive means, the said casing being divided by a partition provided with a port, of a valve member carrying a valve stem, the valve member being adapted to close the port and tending to move to closed position, a cap threaded into the casing serving as a guide for a portion of the stem, a snap-acting thermostatic unit within the housing responsive to temperature variations exteriorly of the housing and casing, means secured to the said unit and a latching member adapted to hold the valve in open position, the latching member being adapted to be tripped by said means secured to the thermostatic unit upon the operation thereof whereby said valve is released to close said port.

9. A temperature controlled device comprising a latching member and a member to be latched in predetermined position by the latching member, a guide for the member to be latched, the guide and the latching member each having a hole therethrough, through which the member to be latched passes, said latching member being hinged on the guide and being adapted to grip the member to be latched when in one position, and to allow said member free motion when in another position, and snap-acting thermostatic means for releasing the latch.

10. A valve comprising the combination within a casing, of a valve member adapted to control a flow of fluid therethrough and tending to move to seating position, a valve stem extending from the valve, a snap-acting thermostatic member actuated by a predetermined temperature change exteriorly of the casing, latch means adapted to hold said stem to hold the valve member in an unseated position, said thermostatic member upon operation being adapted to trip said latch to release said valve stem, whereby said valve member is seated.

11. In combination a valve tending to move to closed position, a stem extending from said valve, a latch adapted to hold said stem to hold the valve in open position and a snap-acting thermostat adapted to operate said latch to release said stem whereby said valve is seated, and a casing adapted to house said combination as a compact unit.

12. In combination, a valve having a tendency to seat, a stem extending from both sides of said valve, one end of said stem being manually operable to unseat said valve, a latch, the other end of said stem passing through said latch, said latch when in one position being adapted to hold said valve stem passing therethrough to hold the valve unseated and to permit free passage of said valve stem when in another position, and a snap-acting thermostat adapted to operate said latch to release said stem whereby said valve is seated.

13. In combination, a fluid flow controlling member having two positions, and tending to assume one of said positions, means extending from said member, a latch adapted to hold said means to hold the member in the other of said positions and a snap-acting thermostat adapted to operate said latch to release said means whereby said member returns to its said first position, and a casing housing said combination as a compact unit.

JOHN A. SPENCER.